United States Patent [19]

Machen

[11] 4,132,015
[45] Jan. 2, 1979

[54] TEACHING-LEARNING AID FOR NUMERATION SYSTEMS AND BASIC COMPUTER CONCEPTS

[76] Inventor: Lonnie Machen, 6514 McHost Rd., Zachary, La. 70791

[21] Appl. No.: 787,318

[22] Filed: Apr. 14, 1977

[51] Int. Cl.² .............................................. G09B 19/02
[52] U.S. Cl. .................................................... 35/31 F
[58] Field of Search ............ 35/30, 31 R, 31 D, 31 F, 35/32, 33

[56] References Cited

U.S. PATENT DOCUMENTS

| | | | |
|---|---|---|---|
| 465,811 | 12/1891 | Anderson | 35/33 |
| 1,818,566 | 8/1931 | McDade | 35/31 R |
| 2,502,238 | 3/1950 | Wade et al. | 35/31 F |
| 2,530,447 | 11/1950 | Birdsall | 35/33 |
| 2,722,754 | 11/1955 | Slote | 35/31 F |
| 3,332,156 | 7/1967 | Reeves | 35/30 |
| 3,436,013 | 4/1969 | Campbell | 35/30 X |
| 3,462,854 | 8/1969 | Schwartz | 35/32 |
| 3,555,703 | 1/1971 | Fapy et al. | 35/30 |
| 3,633,288 | 1/1972 | Le Francis | 35/31 R |

*Primary Examiner*—William H. Grieb
*Attorney, Agent, or Firm*—Roy, Kiesel, Patterson & Abadie

[57] ABSTRACT

A mathematical teaching-learning aid to facilitate teaching and learning a wide range of fundamental concepts and skills associated with numeration systems and computers, comprising an indicating board, a base board and number marker elements, and in an alternate embodiment a base-converter board.

7 Claims, 7 Drawing Figures

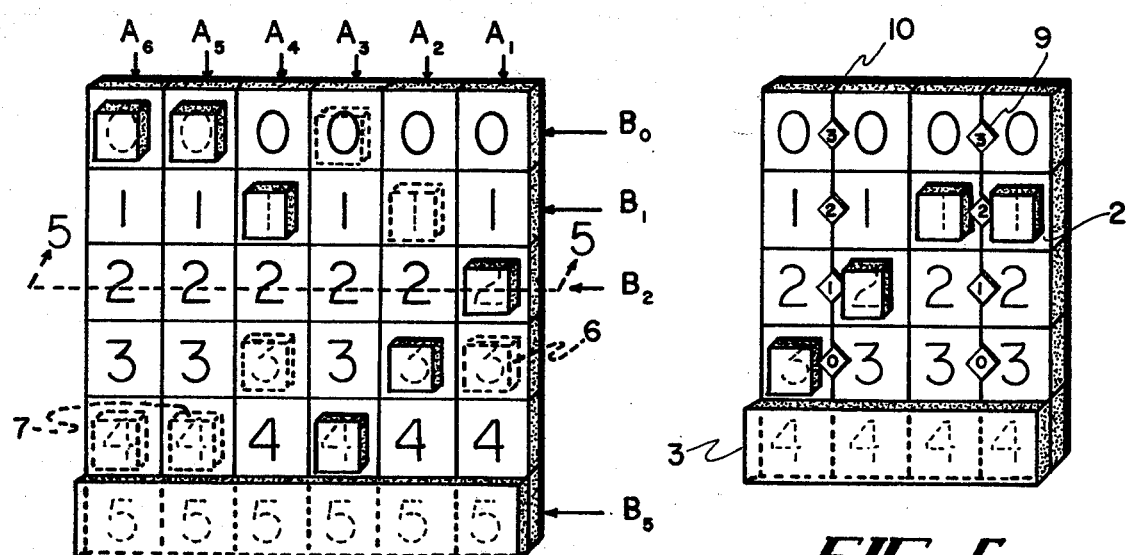
FIG. 4.
FIG. 5.
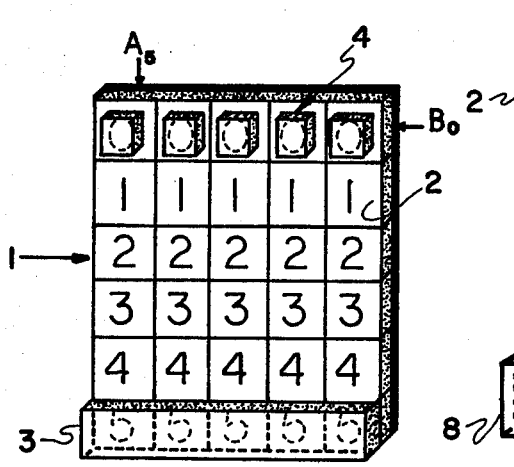
FIG. 3A.
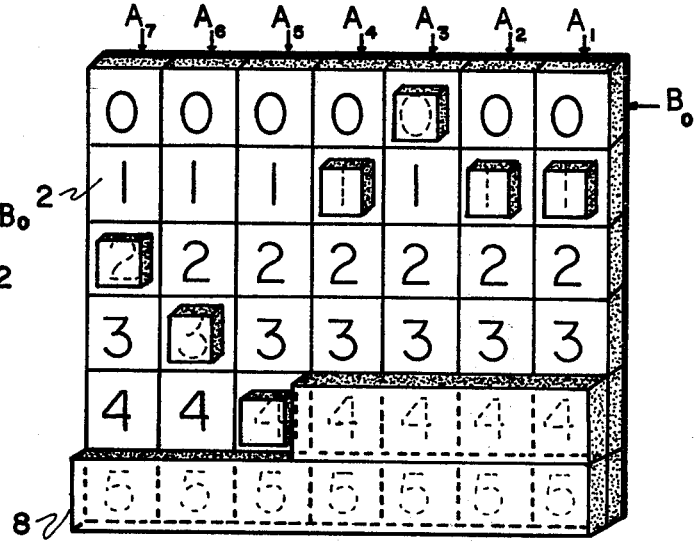
FIG. 2.

TEACHING-LEARNING AID FOR NUMERATION SYSTEMS AND BASIC COMPUTER CONCEPTS

BACKGROUND OF THE INVENTION

1. Field of the Invention

This invention relates broadly to apparatus for teaching mathematics, and more specifically to apparatus for teaching numeration systems and certain basic computer concepts.

2. Prior Art

Various apparatus have been proposed for teaching numeration systems and basic computer science. Examples of such apparatus are disclosed and described in the following U.S. Pat. Nos.: Reeves 3,332,156, issued July 25, 1967, entitled "Numerical Base Conversion Device;" Campbell 3436013, issued Apr. 1, 1969, entitled "Multi-Base Counter Mechanism;" Papy, et al 3555703, issued Jan. 19, 1971, entitled "Equipment for Teaching Mathematics;" and LeFrancis 3633288, issued Jan. 11, 1972, entitled "Base Numeral Game Device."

Although there are various apparatus available, there is a need for an apparatus which is simpler in construction and use, broader in capability and application and which can more clearly, through visual and physical manipulation, demonstrate a wide range of basic concepts and principles associated with numeration systems and computers, such as number representation, addition, subtraction, multiplication, division, complementation, sign tracking, operations on sign numbers, overflow detection, base conversion in and between various base numeration systems.

SUMMARY OF THE INVENTION

Therefore, one object of this invention is to provide an apparatus for teaching numeration systems and certain basic computer concepts that is simple in construction and operation.

Another object of this invention is to provide apparatus which can be used to facilitate teaching and learning a wide range of concepts and skills associated with numeration systems and computers.

Still another object of this invention is to provide apparatus for teaching numeration systems and basic computer science that may be used effectively with a wide range of ability or grade level.

Other objects and advantages of this invention will become apparent from the ensuing descriptions of the invention.

Accordingly, a mathematical teaching-learning apparatus that may be used to facilitate teaching and learning of a wide range of concepts and skills associated with base numeration systems and computers is provided comprising an indicating board having a flat surface with horizontal and vertical columns of spaces drawn thereon with numbers drawn in the spaces where the numbers beginning with the number "0" are increasing consecutively and sequentially in the vertical columns and identical in the horizontal columns, a base board having a width at least that of the horizontal columns and a height of any one of the spaces, which base board is attachable to the indicating board to cover up any desired horizontal column, and number marker elements no larger than any one space and movably attachable to the indicating board.

In another embodiment the mathematical teaching apparatus also comprises a base-converter board having a width at least that of the horizontal columns and a height at one part sufficient to cover one horizontal column and a height at the other part to cover an additional horizontal column.

BRIEF DESCRIPTION OF THE DRAWINGS

FIG. 2 is a perspective view of the indicating board and base-converter board in position for converting from base five to base four and conversely.

FIGS. 3A–3C illustrate the addition of numbers in base five.

FIG. 4 is a perspective view of one embodiment of an indicating board and base board used to illustrate the complement of numerals in various bases.

FIG. 5 is an alternate embodiment of an indicating board and base board used to facilitate complementation.

PREFERRED EMBODIMENTS OF THE INVENTION

The apparatus of this invention cannot ony be used to mechanically demonstrate the basic operations of addition and subtraction of integers in any base, but also multiplication and division (including "decimal" fractions), complementation, sign tracking, operations on sign numbers, overflow detection, base conversion of integers and base conversion of "decimal" fractions. All of this can be accomplished with the use of four simple physical pieces: an indicating board, a base board, a base-converter board and number marking elements.

Figure 1:
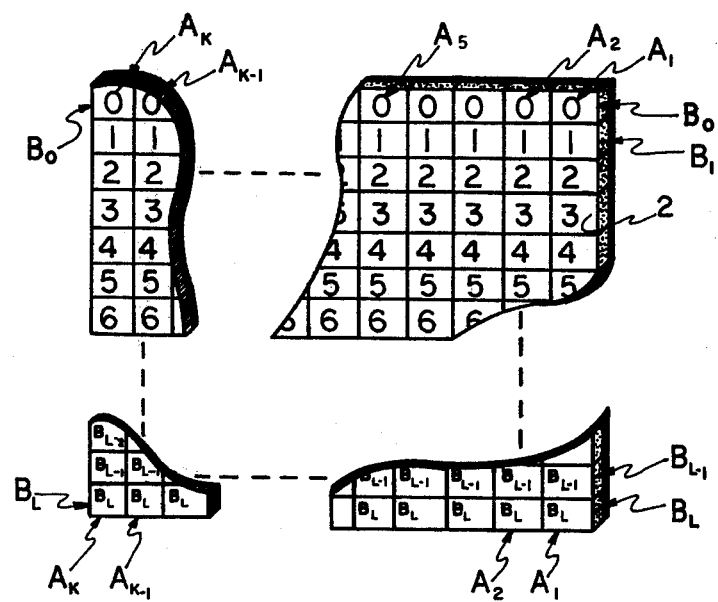
FIG. 1 is a perspective cutaway view of the indicating board having k vertical columns and L+1 horizontal columns.

Referring now to FIG. 1, the indicating board, generally denoted by the numeral 1, is a rectangularly shaped board having a flat surface 2 on which is imprinted multiple vertical columns $A_1$ through $A_k$ and multiple horizontal columns $B_o$ through $B_L$ arranged perpendicular to one another as shown. Within each square formed by the intersecting columns is imprinted a certain numeral depending on the square position. The numerals in any given horizontal column will be identical with one another, and commencing with the top most horizontal column $B_o$ the numbers will be "0" and sequentially one integer larger for each lower column as shown. Thus, in column $B_o$ the numeral will be "0;" and in column $B_1$ the numeral will be "1," etc. On the other hand, vertical columns A have imprinted on each of their squares, starting from the uppermost square in a given column and proceeding downward therefrom, numerals which increase one integer sequentially. Thus, the first square in column $A_1$, $A_2$, etc., is "0;" the second square is "1," etc.

Figure 3C:
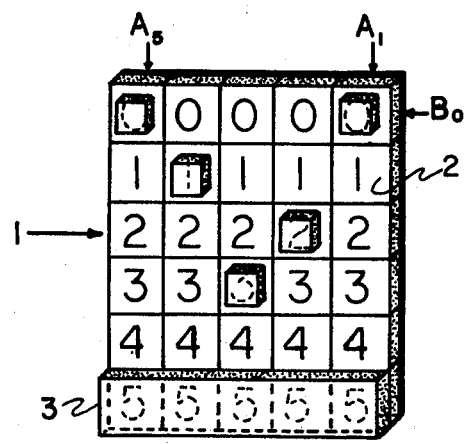
Figure 3B:
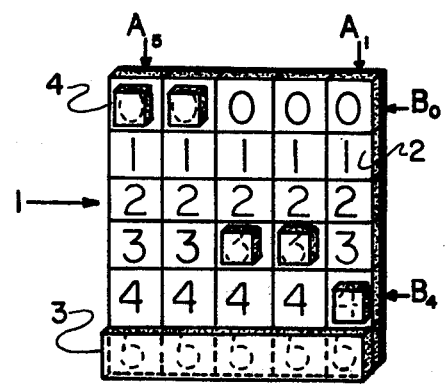

FIGS. 3A–3C illustrate how addition is performed on the apparatus. For example consider adding the numbers 334 and 431 in base five. The base board 3 is first placed across the horizontal row $B_5$ containing the numerals 5. Next the apparatus is zeroed, i.e., the indicating markers 4 are placed over each of the "0's" in the first horizontal column $B_o$ as shown in FIG. 3A. The number 334 is then entered by moving markers 4 down in the appropriate columns as shown in FIG. 3B. In this particular embodiment the numbers are entered from left to right as in a regular calculator. However, alternately, the numbers could be entered from right to left.

Now to add in the numeral 431, count down four spaces in column $A_3$ starting from the position shown in FIG. 3B. If the end of the column is reached, then continue counting through zero and move the marker in the adjacent column $A_4$ down one space. Similarly count down three spaces in column $A_2$ and one space in column $A_1$. The apparatus should now look like that shown in FIG. 3C, wherein the sum of 1320 base five.

For purposes of instruction in the classroom, it is preferred that markers 4 be transparent so that the students can more clearly see the numbers being represented. It is also preferred that they be attached magnetically to indicating board 1 so that it can be vertically positioned.

Subtraction is done in a similar manner as addition except that you count up instead of counting down.

Multiplication is illustrated to the students on the apparatus by the use of repeated addition or subtraction. For example the following two different programs illustrate possible solutions to computing 24 times 123 in base five.

EXAMPLE 1

Again the base board five is placed over horizontal column $B_5$ and the following calculations are made:

| Zero apparatus | | | |
|---|---|---|---|
| Enter | 1230, | | |
| Add | 1230, | getting | 3010 |
| Add | 123, | getting | 3133 |
| Add | 123, | getting | 3311 |
| Add | 123, | getting | 3434 |
| Add | 123, | getting | 4112 |

Therefore, 24 times 123 in base five equals 4112 in base five.

EXAMPLE 2

Alternately, another program for multiplying 24 times 123 in base five is as follows:

| Zero calculator | | | |
|---|---|---|---|
| Enter | 1230, | | |
| Add | 1230, | getting | 3010 |
| Add | 1230, | getting | 4240 |
| Sub | 123, | getting | 4112 |

Again 24 times 123 in base five equals 4112 in base five.

To effect the operation of division with the apparatus by repeated subtraction, one part of the calculator is used to accumulate the quotient and the other part of the calculator is used to perform the subtraction operation. In this example, the four left most columns ($A_{10}$, $A_9$, $A_8$ and $A_7$) will be called the "quotient accumulator" and the remaining six columns ($A_6$, $A_5$, $A_4$, $A_3$, $A_2$ and $A_1$) will be called the "division calculator." The following example will illustrate a program for computing 12144 divided by 23 in base five. Of course, for each subtraction operation in the division calculator one must add 1 to the appropriate quinary place in the quotient accumulator.

EXAMPLE 3

| Division Calculator | | | | Quotient Accumulator | | | |
|---|---|---|---|---|---|---|---|
| Enter 12144 | | | | Clear accumulator | | | |
| sub | 2300, | getting | 4344 | Add | 100 | | |
| Sub | 2300, | getting | 2044 | Add | 100, | getting | 200 |
| Sub | 230, | getting | 1314 | Add | 10, | getting | 210 |
| Sub | 230, | getting | 1034 | Add | 10, | getting | 220 |
| Sub | 230, | getting | 304 | Add | 10, | getting | 230 |
| Sub | 230, | getting | 24 | Add | 10, | getting | 240 |

| Division Calculator | | Quotient Accumulator | | |
|---|---|---|---|---|
| Enter 12144 | | Clear accumulator | | |
| Sub | 23, | getting 1 | Add 1, | getting 241 |

Therefore, 12144 divided by 23 equals 241, remainder 1, base five.

The apparatus in this invention can also be used to demonstrate complementation and therefore make possible the illustration of addition of sign numbers. When performing computations that admit the occurrence of negative numbers, the left most vertical column is used only to reveal the sign of the number in the calculator. This sign tracking principle is used in an analagous manner in many digital computers. The following example will illustrate the use of the apparatus to perform the operation of complementation.

EXAMPLE 4

To represent the complement of 1432 base five, we first enter 01432 into the apparatus (see FIG. 4). Then each marker is reflected through an imaginary horizontal line 5 that bisects the indicating board above base board 3. In this case, the imaginary horizontal line bisects horizontal column $B_2$, thus the reflected markers 6 should now show 443012. To this result, 1 is added, getting 443013. This, then, is the apparatus' representation of minus 1432 base five.

Making use of complementation one can now demonstrate the addition of sign numbers in any base. In computing in base k, the calculator entry is positive if the sign-overflow marker 7 is on zero, is negative if it is on $k-1$, and an overflow condition exists if it marks any other digit. The program that follows shows how to compute minus 312 plus 213 minus 123 in base five. Since in this case the sum cannot contain more than four digits, we need only use the five right most columns ($A_5$, $A_4$, $A_3$, $A_2$, $A_1$) of the indicating board. Therefore, in this case, the marker 7 in column $A_5$ is the sign-overflow indicator.

EXAMPLE 5

| Step 1 | Clear calculator | |
|---|---|---|
| Step 2 | Enter 312 | |
| Step 3 | Complement 312, getting | 44133 |
| Step 4 | Add 213, getting | 44401 |
| Step 5 | Sub 123, getting | 44223 |
| Step 6 | Complement 44223, getting | 222 |

Note that step 5 reveals that the sum is negative since the sign-overflow indicator 7 rests on a 4 in column $A_5$.

Therefore, minus 312 plus 213 minus 123 equals minus 222 in base five.

To perform conversion from one base system to another, base-converter board 8 is utilized. Base-converter board 8 has a width at least that of the horizontal columns B and a height on one-half sufficient to cover one horizontal column A and a height at the other half to cover an additional horizontal column A as shown in FIG. 2. To illustrate the base conversion process, consider changing 234 base five to its base four equivalent. In this case, the left half of the apparatus (columns $A_5$, $A_6$ and $A_7$) will be utilized as a base five calculator to store the number 234 and the right half (columns $A_1$, $A_2$, $A_3$ and $A_4$) as a base four calculator to accumulate the results of the conversion process. The general idea in effecting the conversion is that for each digit of the entry in the storage accumulator, a corresponding and equivalent series of entries are made in the conversion accumulator by the unique utilization of Pascal's triangle. Each digit of the number in the storage accumulator, along with a certain row of Pascal's triangle, determine a series of one or more base board entries for the conversion accumulator. Conversion of an n digit number requires the first n rows of Pascal's triangle with base four entries. Because 234 is a three digit number, the first three rows of Pascal's triangle are utilized.

```
            1
        1       1
    1       2       1
```

The following program illustrates the conversion of 234 base five to its base four equivalent.

EXAMPLE 6

| Base 5 Storage Accumulator | Base 4 Conversion Accumulator | | |
|---|---|---|---|
| Clear storage accumulator | Clear conversion accumulator | | |
| Enter 234 | Add 121 | 2 times, | getting 302 |
| | Add 11 | 3 times, | getting 1001 |
| | Add 1 | 4 times, | getting 1011 |

Therefore, 234 base five equals 1011 base four.

The first digit, 2, in the storage accumulator tells how many times the last row of Pascal's triangle, 121, is to be added in the coversion accumulator. The second digit, 3, of the storage accumulator tells how many times the second row (from bottom) of Pascal's triangle is to be added in the conversion accumulator. In general, the kth digit (counting from left) of the number in the storage accumulator tells how many times the kth row (from bottom) of Pascal's triangle is to be added in the conversion accumulator.

In converting from a lower base to a higher base, a sign modified Pascal's triangle is utilized. For example in the conversion of 1231, base four to base five, the following Pascal triangle is utilized:

```
                1
            1       -1
        1       -2       1
    1       -3       3       -1
```

The following example illustrates the conversion of 1231 base four to base five.

EXAMPLE 7

| Base 4 Storage Accumulator | Base 5 Conversion Accumulator | |
|---|---|---|
| Enter 1231 | Clear conversion accumulator | |
| | Add 1000, getting 1000 | |
| | Sub 300, getting 200 | See Note$_1$. |
| | Add 30, getting 230 | |
| | Sub 1, getting 224 | |
| | Add 100, 2 times, getting 424 | |
| | Sub 20, 2 times, getting 334 | See Note$_2$. |
| | Add 1, 2 times, getting 341 | |
| | Add 10, 3 times, getting 421 | See Note$_3$. |
| | Sub 1, 3 times, getting 413 | |

| Base 4 Storage Accumulator | Base 5 Conversion Accumulator | |
|---|---|---|
| | Add 1, 1 time, getting 414 | See Note$_4$. |

Note$_1$
This segment of program adds in fourth row of triangle one time.
Note$_2$
This segment of program adds in third row of triangle two times.
Note$_3$
This segment of program adds in second row of triangle three times.
Note$_4$
This segment of program adds in first row of triangle one time.

Therefore, 1231 base four equals 414 base five.

This base conversion algorithm allows one to convert a number from base k to base k±1, and hence by induction from any base to any other base. To change from base five to base three, for example, the conversion sequence is from base five to base four to base three. At each step of the conversion sequence, one need only reposition base-converter board 8 to avoid having to memorize or record any intermediate result.

There are, of course, many other ways in which the apparatus of this invention can be utilized to demonstrate various mathematical operations in different bases. It can also, for example, be used to demonstrate the conversion of "decimal" fractions using Pascal's triangle.

FIG. 5 illustrates an alternate embodiment of the indicating board which increases the ease and efficiency of demonstrating complementation. In this embodiment, small removable discs 9 are placed on the vertical boundaries 10 of the squares, preferably just the alternate vertical boundaries, and are placed in the same horizontal line as the numerals in the square. On each disc 9 is a numeral which when placed on indicating board 1 form a consecutively decreasing sequence. These discs 9 could be removably attached to a metal indicating board 1 by magnets. Now in utilizing this alternate embodiment one could enter minus 123 in base four simply be entering 0123 directly but observing the disc numbers instead of the square numbers and then adding 1 as usual. The correct calculator representation is 3211.

As can be seen from the above examples, the apparatus of this invention provides insight into how numbers in any base may be mechanically represented and computed. It also provides a clear understanding of the mathematical sameness (isomorphic relatedness of such number systems). In addition it provides a clear mechanical interpretation of carrying and borrowing principles. Still further the apparatus of this invention enables the student to obtain a better understanding and appreciation of the principles of subtraction by the addition of complements, a principle widely used in digital computers. These and other benefits are provided by an apparatus which is not only simple in design but also construction and operation, as well as efficient in demonstrating various mathematical principles.

There are, of course, various modifications in the shape, size, method of attaching markers to the indicating board 1, etc., of the various elements of the apparatus and no limitation in the scope of this invention is intended except as found in the following claims.

What I claim is:

1. A mathematical teaching-learning apparatus utilizing cyclic counting to facilitate teaching and learning a wide range of fundamental concepts and skills associated with numeration systems and computers, comprising:
- (a) an indicating board having a flat surface with horizontal and vertical columns of spaces drawn thereon with numbers placed in said spaces wherein said numbers beginning with the numeral 0 are consecutively increasing in said vertical columns and identical in any one of said horizontal columns;
- (b) a base board having a width at least that of said horizontal columns and a height of one of said spaces, said base board being placeable on said indicating board to cover up any of said horizontal columns; and
- (c) number marker elements no larger than any one of said spaces and placeable on said indicating board.

2. A mathematical teaching-learning apparatus according to claim 1 wherein said mathematical teaching apparatus comprises a base-converter board for structuring said indicating board for making conversion from one base to another base having a width at least that of said horizontal columns and a height at one part sufficient to cover one of said horizontal columns and a height at another part to cover an additional one of said horizontal columns, said base-converter board being placeable on said indicating board.

3. A mathematical teaching-learning apparatus according to claim 1 wherein said base board is attachable to said indicating board.

4. A mathematical teaching-learning apparatus according to claim 1 wherein said elements are attachable to said indicating board.

5. A mathematical teaching-learning apparatus according to claim 1 wherein said base board's height at one part being sufficient to cover one of said horizontal columns and another part to cover an additional one of said horizontal columns for purposes of structuring said indicating board for making conversions from one base to another base.

6. A mathematical teaching-learning apparatus according to claim 1 wherein there is only one of said number marker elements per vertical column.

7. A mathematical teaching-learning apparatus utilizing cyclic counting to facilitate teaching and learning a wide range of fundamental concepts and skills associated with numeration systems and computers, comprising:
- (a) an indicating board having a flat surface with horizontal and vertical columns of spaces drawn thereon with numbers placed in said spaces wherein said numbers beginning with the numeral 0 are consecutively increasing in said vertical columns and identical in any one of said horizontal columns;
- (b) a base board having a width at least that of said horizontal columns and a height of one of said spaces, said base board being placeable on said indicating board to cover up any of said horizontal columns;
- (c) number marker elements no larger than any one of said spaces and placeable on said indicating board; and
- (d) removable discs for use in teaching complementation placed between said vertical columns of spaces, said discs having disc numerals placed thereon and arranged in integrally decreasing sequence starting with said horizontal column having said 0.

* * * * *